United States Patent

Nakhamkin et al.

[11] Patent Number: 5,845,479
[45] Date of Patent: Dec. 8, 1998

[54] METHOD FOR PROVIDING EMERGENCY RESERVE POWER USING STORAGE TECHNIQUES FOR ELECTRICAL SYSTEMS APPLICATIONS

[75] Inventors: Michael Nakhamkin, Basking Ridge, N.J.; Robert Schainker, Woodside, Calif.

[73] Assignee: Electric Power Research Institute, Inc., Palo Alto, Calif.

[21] Appl. No.: 9,246

[22] Filed: Jan. 20, 1998

[51] Int. Cl.⁶ ..................................... F02C 6/16
[52] U.S. Cl. ........................... 60/39.02; 60/727
[58] Field of Search ................... 60/39.02, 727, 60/659

[56] References Cited

U.S. PATENT DOCUMENTS

| | | | |
|---|---|---|---|
| 3,831,373 | 8/1974 | Flynt | 60/727 |
| 4,237,692 | 12/1980 | Ahrens et al. | 60/659 |
| 4,630,436 | 12/1986 | Frutschi | 60/727 |
| 4,686,822 | 8/1987 | Frutschi | 60/727 |
| 4,765,142 | 8/1988 | Nakhamkin | 60/727 |
| 4,872,307 | 10/1989 | Nakhamkin | 60/727 |
| 4,885,912 | 12/1989 | Nakhamkin | 60/659 |

FOREIGN PATENT DOCUMENTS

2020367   11/1979   United Kingdom .............. 60/727

Primary Examiner—Charles C. Freay
Assistant Examiner—Timothy Thorpe
Attorney, Agent, or Firm—Farkas & Manelli,pllc; Edward J. Stemberger

[57] ABSTRACT

A combustion turbine power generation system includes a modified simple cycle combustion turbine power generation system optimized for a "hot" stand-by reserve mode of operation and having a power shaft assembly including a compressor, an expansion turbine, and a double-ended motor/generator between the compressor and the turbine. The motor/generator has a turbine driving clutch structure on one end thereof and a compressor driving clutch structure on the other end thereof. A combustor feeds the expansion turbine. The power generation system includes an additional system having a boost compressor, an intercooler feeding cooled air to the boost compressor an electric motor for driving the boost compressor, and aftercooler downstream of the boost compressor. A compressed air energy storage is downstream of the aftercooler. The additional system is integrated with the modified simple cycle combustion turbine power generation system to provide (i) a primary mode of operation—a hot stand-by mode, when the plant is ready to deliver an emergency power at full turbine power of specified duration within a few seconds; (ii) a cold start-up mode of operation, when the plant is ready to deliver an emergency power at full turbine power of specified duration within a few minutes, depending on the specifics of the turbine design, (iii) an emergency power supply mode, when the plant provides emergency power at full turbine power of specified duration; (iv) a combustion turbine emergency power supply mode, when the plant provides approximately 50% of full turbine power of unlimited duration during long term interruptions of the power supply; and (v) a storage charging mode of operation to charge the air storage.

23 Claims, 6 Drawing Sheets

METHOD FOR PROVIDING EMERGENCY RESERVE POWER USING STORAGE TECHNIQUES FOR ELECTRICAL SYSTEMS APPLICATIONS

This invention relates to a power plant which provides an electric grid/substation (EGS) with a cost-effective and quick response electric energy storage to maintain quality power supply and to provide reserve power in case of a temporary interruption of the network energy supply.

BACKGROUND OF THE INVENTION

Two major characteristics determine quality and reliability of a power supply, quick response and sufficient amount of energy stored. It is particularly essential for independently operating and budgeted substations, who bear an ultimate responsibility for uninterruptible, high quality electric power supply to customers, to have a customized energy storage device to provide quick-response electric power, or face various liabilities.

There are a number of electric energy storage devices available such as electric batteries, fuel cells, capacitors, flywheels and SMES—all characterized by a sufficiently quick response time, but they are also very expensive to manufacture when significant amounts of stored energy are involved. Compressed air energy storage (CAES) plants are optimized for load management to store energy during night hours (non-peak hours) and to deliver the stored energy during peaking hours. CAES plants generally utilize various underground geological formations such as hard rock, salt deposits or aquifers for air storage. However, the large volume air storage requirements limit the possible locations of a CAES plant and are thus not suited for substation applications. Further, a CAES plant is typically 100 MW–300 MW in size and, as noted above, is optimized for a cost-effective load management of utility power generation and is customized for the particular plant location and application. In order to have a competitive efficiency, a CAES plant generally requires a sophisticated thermal cycle with multiple intercoolers, reheat and recuperation. All these features increase engineering and operating complexity with negative effects on cost, reliability and availability. Thus, the cost, size and complexity of a CAES plant, in all practicality, prohibits its use in providing emergency power at a substation. Though a CAES plant has a relatively quick start-up by power plant standards of twenty to forty minutes, it is not sufficiently quick to provide emergency power at a substation which requires electric power within seconds and for frequency controls, even within less than one second.

There is thus a need for a power plant, designed specifically to provide a substation with emergency power and optimized to operate in a "hot" stand-by reserve mode of operation, which is capable of storing significant amounts of energy in a cost effective manner with the following characteristics:

- quick release of the energy with start-up time less than 1 minute and even faster;
- simple and fully automated with remote control operation;
- easy siting at a substation location;
- variety of sizes with predominance of relatively small capacities up to 30 MW;
- lowest possible capital cost and relative insensitivity to operating costs; and
- the highest possible start-up availability and reliability.

SUMMARY OF THE INVENTION

An object of the invention is to fulfill a need for a novel power plant providing a substation with a power reserve with the aforementioned characteristics. This in-turn leads to a novel power plant designed and optimized to provide an uninterrupted power supply with a novel approach to the plant's thermal cycle and conceptual configuration, and new operating methods and specific requirements for component selections.

The thermal cycle of the novel power plant is simple and includes the use of a standard combustion turbine and minimal equipment to store air preferably above the ground. The simple thermal cycle thus does not offer high efficiency, but the thermal cycle makes sense in a system that operates only in emergency situations to provide short duration, emergency power at a substation generally within seconds.

The conceptual configuration of the novel power plant includes providing a standard combustion turbine, a boost compressor and an air storage, preferably in the form of an above-ground, man-made structure. These components are of relatively small size to provide short duration, emergency power at a substation within seconds.

The new operating methods of the novel power plant include (a) a primary mode of operation—a "hot" stand-by mode, when the plant is ready to deliver an emergency power of specified duration at full turbine power within a few seconds; (b) a "cold" stand-by reserve mode of operation, when the plant is ready to deliver an emergency power of specified duration at full turbine power within a few minutes, depending on the specifics of the turbine design, (c) an emergency power supply mode, when the plant provides emergency power of specified duration at full turbine power; (d) a combustion turbine emergency power supply mode, when the plant provides approximately 50% of full turbine power of unlimited duration during long term interruptions of the power supply; and (e) a charging mode of operation to charge the air storage/vessel.

In accordance with the principles of the present invention, the above-mentioned object and additional objects are attained by providing a method which allows a simple cycle combustion turbine (SCCT) to be modified and complemented with an additional compression and compressed air storage system (ACCASS), to result in a novel Uninterrupted Power Supply and Storage Plant (UPSSP) which can provide an electric grid/substation with a cost-effective and quick response electric power and provide reserve power in case of temporary interruption of the energy supply.

The method of the invention includes providing electric power with a simple cycle combustion turbine (SCCT) having a shaft assembly including a compressor, an expansion turbine, a motor/generator connected to either the compressor or the turbine, and a combustor feeding the turbine. For the majority of applications the SCCT has a relatively small capacity of up to approximately 10 MW, but does not exclude the use of larger combustion turbines for super-substations.

The invention includes modifying a SCCT, which includes replacing a generator (having a drive coupling) of a power shaft assembly with a double-ended motor/generator (having drive couplings) and automatically controlled clutches on both its ends. The double-ended motor/generator of the power shaft assembly is located between the compressor on one end and the turbine on another end of the power shaft assembly. The modification also includes ensuring that the double-ended motor/generator of the power shaft assembly can be driven by the turbine via an engaged automatic turbine driven clutch (ATC) at one end of the power shaft assembly and ensuring the compressor is driven by the electric motor/generator via an engaged automatic compressor driving clutch (ACC) on the other end of the power shaft assembly.

The inventive method also includes providing an additional compression and compressed air storage system (ACCASS) which consists of: a) an additional shaft assembly comprising a boost compressor, with an intercooler feeding the boost compressor, and an electric motor and drive coupling operatively associated with the boost compressor; b) a compressed air storage vessel/system; and c) piping and valves connecting a modified SCCT downstream of the compressor of the power shaft assembly to an inlet of an intercooler feeding the boost compressor. A discharge of the boost compressor is connected, through an aftercooler, to the compressed air storage/vessel system and the compressed air storage/vessel system is connected to the combustor feeding the turbine.

The invention further includes providing an integration of the modified SCCT and an ACCASS into a new Uninterrupted Power Supply and Storage Plant (UPSSP) configuration ensuring alternative flow path arrangements corresponding to the following operating modes: (a) a primary mode of operation—a "hot" stand-by mode, when the plant is ready to deliver an emergency power of specified duration at full turbine power within a few seconds; (b) a "cold" stand-by reserve mode of operation, when the plant is ready to deliver an emergency power of specified duration at fill turbine power within a few minutes, depending on the specifics of the turbine design, (c) an emergency power supply mode, when the plant provides emergency power of specified duration at full turbine power; (d) a combustion turbine emergency power supply mode, when the plant provides approximately 50% of fill turbine power of unlimited duration during long term interruptions of the power supply; and (e) a charging mode of operation to charge the air storage/vessel.

The invention provides that a modified SCCT is connected to an ACCASS via a first valve system (FVS), which is installed on a path connecting a discharge of the compressor of the power shaft assembly to an intercooler feeding a boost compressor of the additional shaft assembly of an ACCASS. A second valve system (SVS) is installed on the path connecting the compressed air storage/vessel system of an ACCASS to a point on a modified SCCT upstream of the combustor. A third valve system (TVS) is installed on a bypass path connecting an output of the compressor of the power shaft assembly to the inlet of the combustor.

The primary mode of operation, the hot stand-by reserve mode, is provided when the automatic turbine driving clutch (ATC) is engaged and the automatic compressor driving clutch (ACC) is disengaged such that the turbine drives the motor/generator with the turbine operating with the motor/generator synchronized with substantially zero power generated except for the power needed to cover mechanical and other losses. The first and third valve systems are closed and the second valve system is partially open to provide minimal air flow to said combustion to have the turbine driven motor generator synchronized with an electric grid to provide emergency power at full turbine power of specified duration within seconds when the second valve system is opened further.

The "cold" stand-by reserve mode of operation is provided when the automatic compressor driving clutch (ACC) is disengaged and the automatic turbine driving clutch (ATC) is engaged such that the turbine is ready to drive the motor/generator. The first, second and third valve systems are closed with the second valve system being ready to be opened to define an air and gas flow path where compressed air stored in the air storage/vessel may move to the combustor and gas may move to the turbine for cold start-up thereof, for electric power generation at full turbine power of specified duration generally within minutes, as a function of heating requirements of the turbine.

The emergency power generation mode of operation is provided when the automatic compressor driving clutch (ACC) is disengaged and the automatic turbine driving clutch (ATC) is engaged such that the turbine drives the motor generator. The first and third valve systems are closed and the second valve system is open so as to define an air and gas flow path where compressed air from the air storage/vessel expands as motive fluid through the turbine with the power generated by the turbine being delivered to an electric grid to provide emergency power at full turbine power of specified duration.

The combustion turbine emergency power generation mode of operation is provided when the automatic compressor driving clutch (ACC) is engaged and the automatic turbine driving clutch (ATC) is engaged such that the turbine drives the motor generator and compressor. The first and second valve systems are closed and the third valve system is open so as to define an air and gas flow path where compressed air from the compressor moves to the combustor and then gas moves to the turbine of the power shaft assembly to produce power at approximately 50% of full turbine power of unlimited duration.

The charging mode of operation is provided when the automatic turbine driving clutch (ATC) is disengaged and the automatic compressor driving clutch (ACC) is engaged such that the compressor of the power shaft assembly is driven by the motor/generator. The second and third valve systems are closed and the first valve system is open so as to define an air flow path where compressed air from the compressor moves through the intercooler and is then further compressed in the boost compressor and cooled in the aftercooler. The cooled, compressed air thereafter is charged into the air storage/vessel. The motor/generator and the electric motor are coupled to and powered by an electric grid.

Another object of the invention is to provide an emergency power generation system for performing the above modes of operation.

The above and other objects of the present invention will become apparent during the course of the following detailed description and appended claims.

The invention may be best understood with reference to the accompanying drawings wherein illustrative embodiments are shown, and like parts are given like reference numerals.

DETAILED DESCRIPTION OF THE PRESENTLY PREFERRED EXEMPLARY EMBODIMENT

Figure 1:
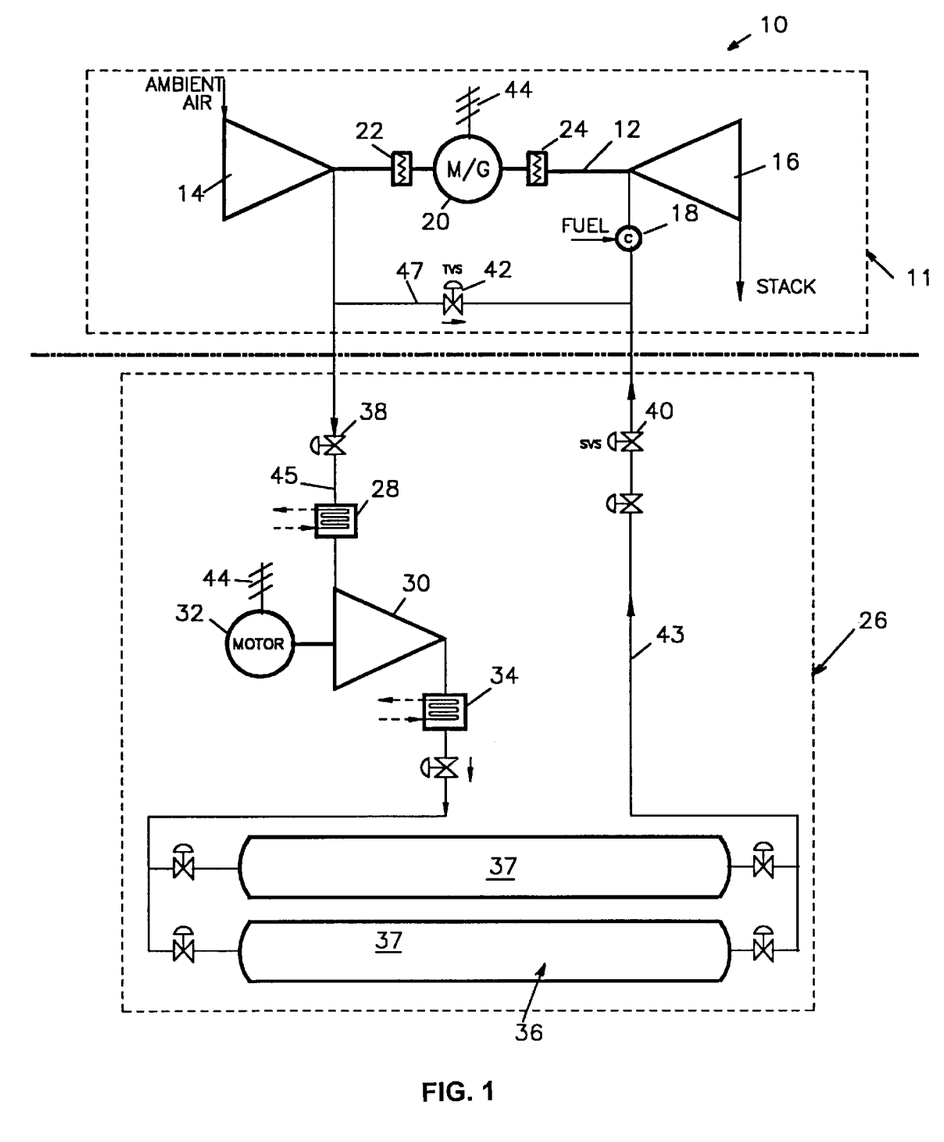
FIG. 1 is a schematic diagram of a combustion turbine power generation system provided in accordance with the principles of the present invention.

Referring to the drawings, FIG. 1 is a schematic diagram of a stand-alone, Uninterrupted Power Supply and Storage Plant (UPSSP), generally indicated at 10, provided in accordance with the principles of the present invention. FIGS. 2–6 illustrate the following operations of the UPSSP 10 respectively: "hot" stand-by reserve mode, a "cold" stand-by reserve mode, an emergency power generation mode of specified duration, a combustion turbine emergency power mode of unlimited duration, and a compressed air storage recharging mode, as will be explained in more detail below.

The UPS SP 10 (FIG. 1) presents a modified Simple Cycle Combustion Turbine (SCCT), which is is a generic single-shaft combustion turbine in combination with an additional Air Compression and Compressed Air Storage System (ACCASS).

The UPSSP 10 includes a modified SCCT 11 having a power shaft assembly, generally indicated at 12, consisting of a compressor 14, an expansion turbine 16, and a combustor 18, which feeds heated combustion product gas to the turbine 16. The UPSSP 10 is modified by replacing the standard generator with a double-ended electric motor/generator 20 having two automatic clutches, automatic compressor driving clutch (ACC) 22 at a compressor end and an automatic turbine driving clutch (ATC) 24 at a turbine end of the shaft assembly 12. The motor/generator 20 and clutches 22 and 24 are conventional, as disclosed, for example, in U.S. Pat. No. 4,765,142, the content of which is hereby incorporated by reference into the present specification. The turbine 16 via engaged ATC 24 and ACC 22 drives the electric motor/generator 20 and the compressor 14, respectively. The system 10 also includes an additional air compression and compressed air storage/vessel system (ACCASS), generally indicated at 26 (the system shown generally below the horizontal dotted line in FIG. 1). The additional system 26 includes an intercooler 28, at least one boost compressor 30 and an electric motor 32 coupled to the boost compressor 30 to drive the boost compressor. Also, the additional system 26 includes an aftercooler 34 and a compressed air storage/vessel system, generally indicated at 36. A first valve system (FVS) 38, a second valve system (SVS) 40 and a third valve system (TVS) 42 provide for various flow arrangements to facilitate the inventive methods of the UPSSP 10 operations, as will be explained below. The air storage/vessel system 36 may be an underground geological formation, such as salt, hard rock or aquifers. However, to facilitate siting of the UPSSP 10 at electric grids or substations, it is preferable to provide the air storage/vessel system 36 in the form of one or more man-made structures 37, such as pressure piping, pressure vessels, reinforced concrete structures, or any man-made structure capable of storing compressed air.

The valve systems are conventional and may include a plurality of controllable valves. It can be appreciated that the integration of the modified SCCT with the ACCASS results in the inventive UPSSP 10.

Figure 2:
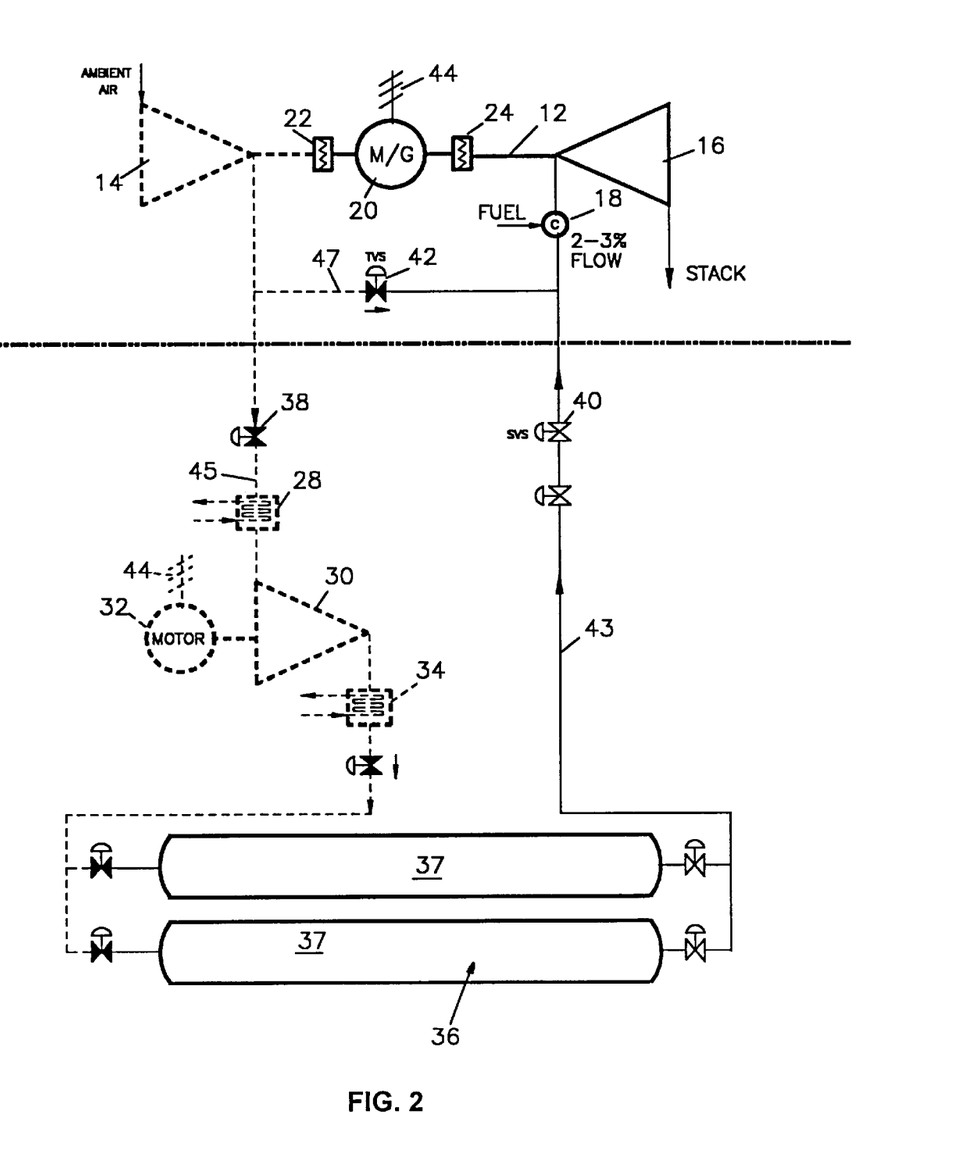
FIG. 2 is a schematic diagram of the system of FIG. 1, showing a hot stand-by reserve mode of operation.

The UPSSP 10 is optimized to operate generally exclusively in a "hot" stand-by reserve mode of operation as shown in FIG. 2 with the fastest possible start-up. Thus, the UPSSP 10 only operates when emergency power is needed. Therefore, efficiency of the UPSSP 10 is not a concern as it is with other sophisticated plants such as CAES plants. The "hot" stand-by reserve mode of operation is provided when the automatic turbine driving clutch (ATC) 24 is engaged and the automatic compressor driving clutch (ACC) 22 is disengaged such that the turbine 16 drives the motor/generator 20 with the turbine 16 operating with the motor/generator 20 synchronized with substantially zero power generated (except for power to cover mechanical and other losses). The first valve system (FVS) 3 8 and third valve system (TVS) 42 are closed and the second valve system (SVS) 40 is partially open to direct approximately 2–3% of the maximum compressed air flow from the air storage/vessel system 36 through connecting structure 43 to the turbine 16 to make-up for mechanical and other losses which occur while keeping the turbine 16 moving or in a "hot" condition. Thus, the turbine driven motor/generator 20 is synchronized with an electric grid 44. The SVS 40 is ready to be opened further to provide additional compressed air stored in the air storage/vessel system 36 to the combustor 18 so that gas moves to the operating or "hot" turbine 16 of the power shaft assembly for maximum electric power generation (full turbine power) within seconds when needed. Thus, uninterrupted quality power may be supplied to customers by the transmission system. The "hot" stand-by reserve mode of operation is of specified duration, limited by the air storage/vessel capacity. The air used from the air storage/vessel system 36 to maintain movement of the turbine 16 can be replenished as necessary by recharging the air storage/vessel system 36 as will be explained below.

It is noted that since the UPSSP 10 operates mostly in this "hot" stand-by reserve mode, the UPSSP 10 is optimized for providing this reserve power. Since the UPSSP 10 is not running continuously, the efficiency thereof is of little consequence. Thus, the idea is to make the UPSSP as inexpensive as possible to be available for power generation within seconds after start-up. Further, the UPSSP 10 is contemplated as being available in a variety of sizes using any combustion turbine and modifying it with an ACCASS.

Figure 3:
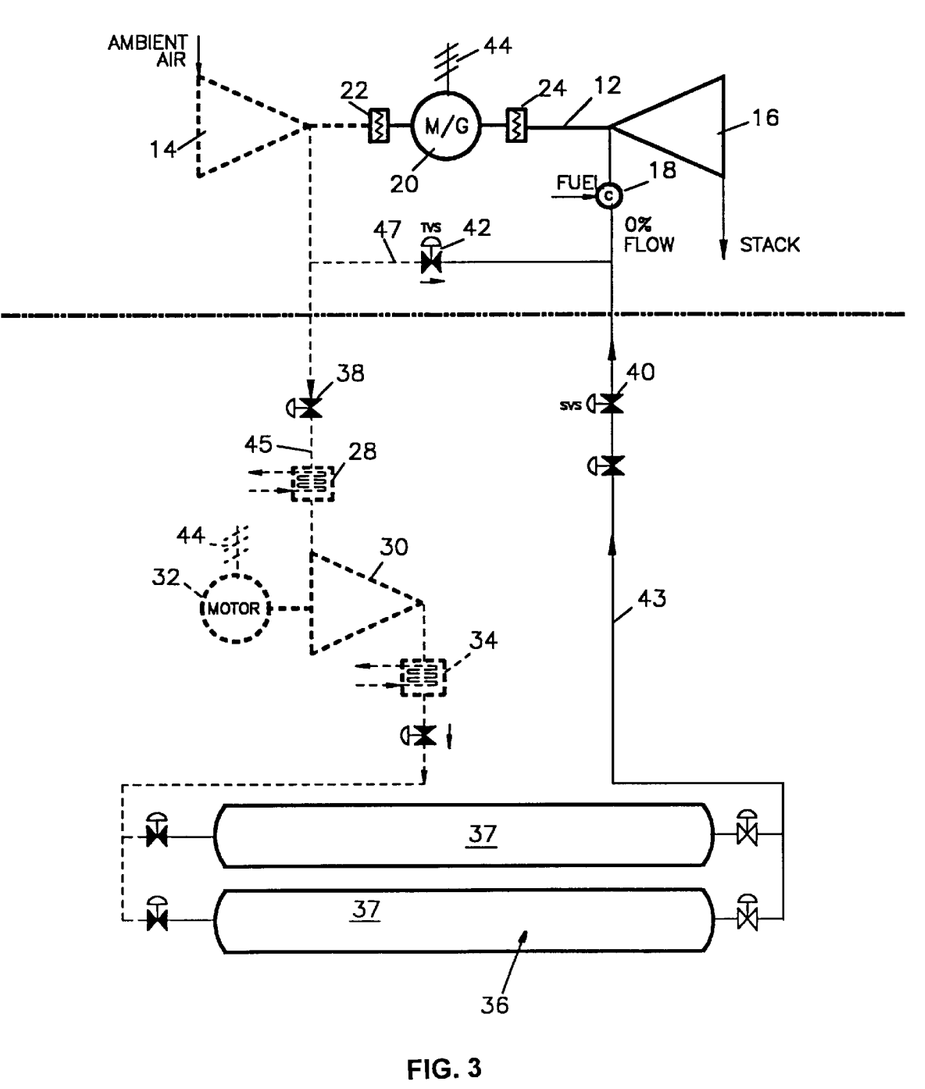
FIG. 3 is a schematic diagram of the system of FIG. 1, showing a cold stand-by mode of operation.

The "cold" stand-by reserve mode of operation is shown in FIG. 3 and is provided when the automatic compressor driving clutch (ACC) 22 is disengaged and the automatic turbine driving clutch (ATC) 24 is engaged such that the turbine 16 is ready to drive the motor/generator 20. The first valve system (FVS) 38, the second valve system (SVS) 40 and the third valve system (TVS) 42 are closed, with the second valve system (SVS) being ready to be opened to define an air and gas flow path where compressed air stored in the air storage/vessel 36 may move through the connection structure 43 to the combustor 18 and gas may move to the turbine 16 for cold start-up thereof, for electric power generation (at full turbine power) within minutes, as a function of heating requirements of the turbine. The "cold" stand-by reserve mode of operation is of specified duration, limited by the air storage/vessel capacity.

Figure 4:
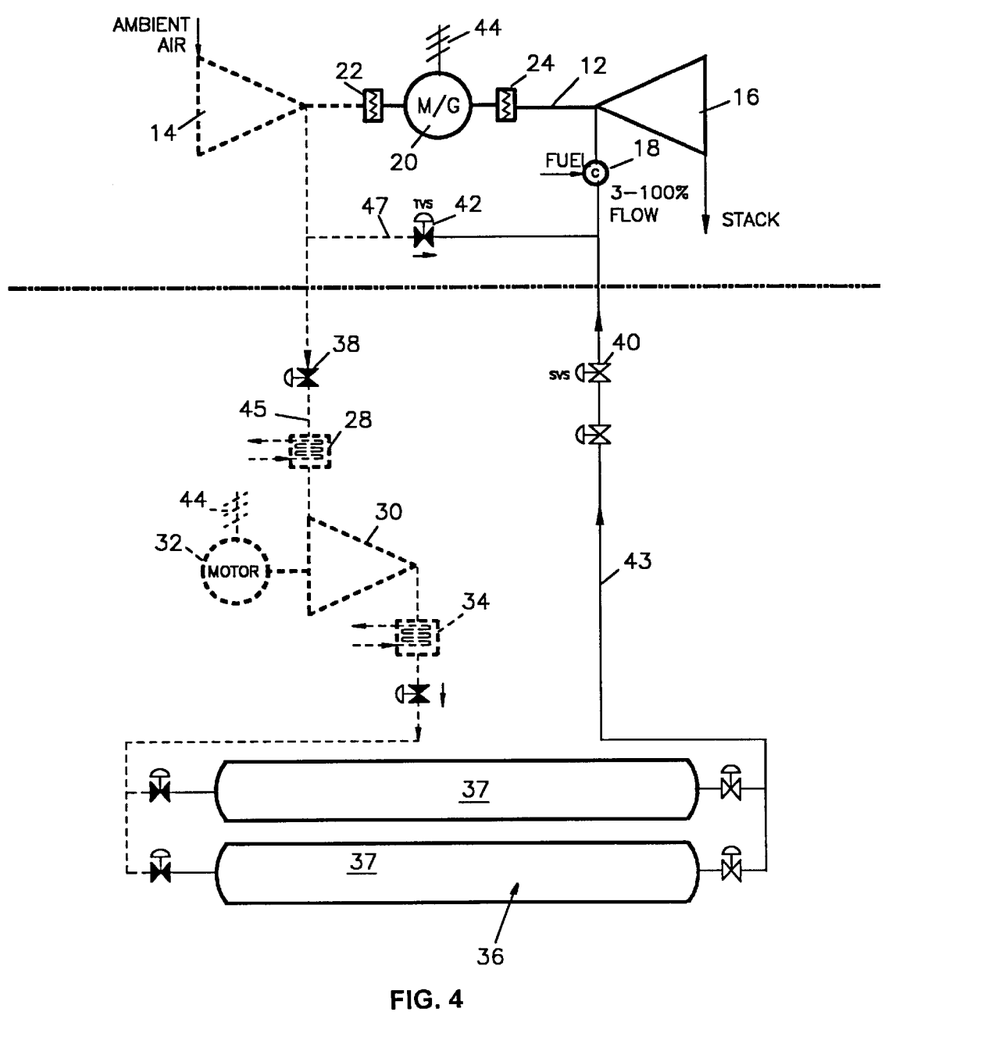
FIG. 4 is a schematic diagram of the system of FIG. 1, showing an emergency power generation mode of operation having limited duration.
Figure 5:
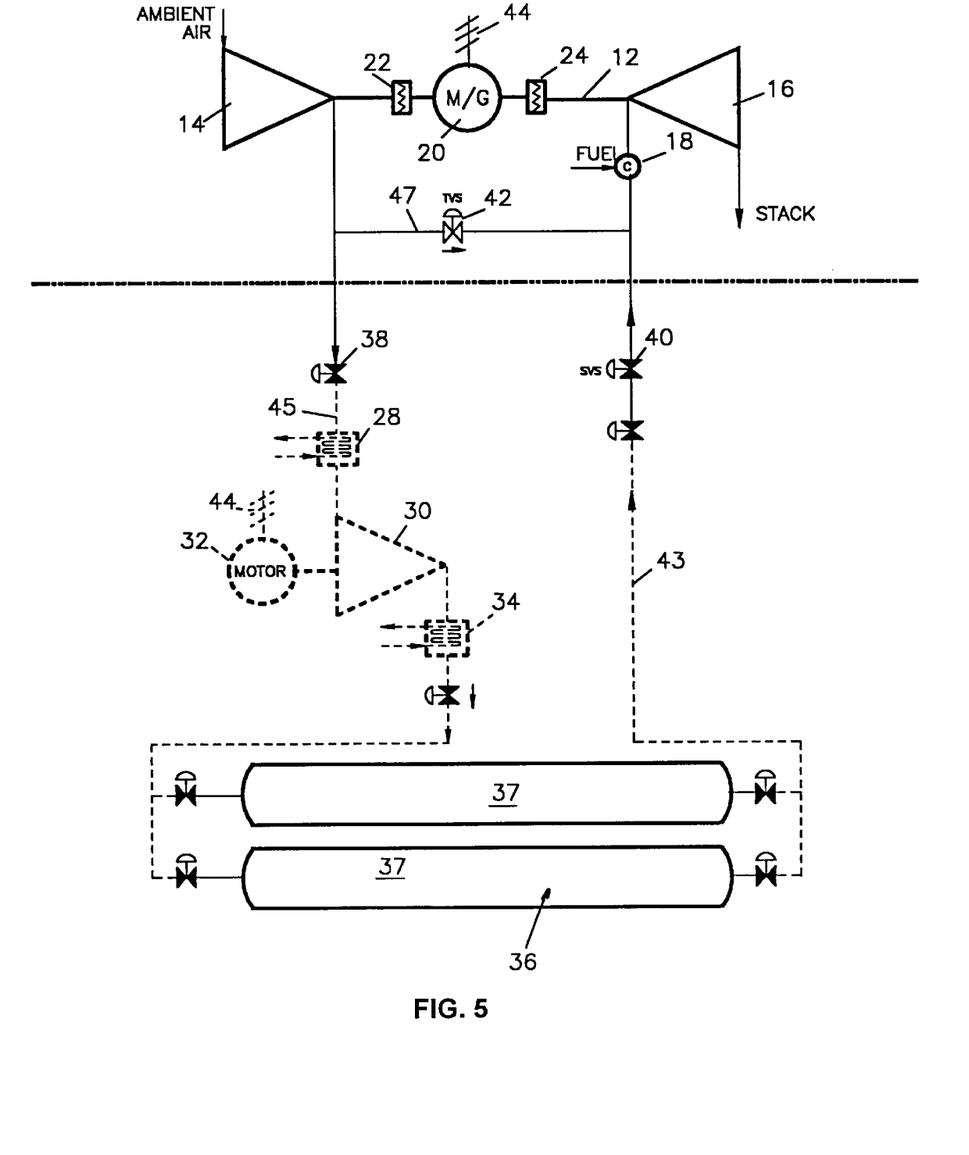
FIG. 5 is a schematic illustration of the system of FIG. 1 in a combustion turbine emergency power generation mode of operation having unlimited duration.

The emergency power generation mode of operation is shown in FIG. 4 and is provided when the automatic compressor driving clutch (ACC) 22 is disengaged and the automatic turbine driving clutch (ATC) 24 is engaged such that the turbine 16 drives the motor/generator 20. The first valve system (FVS) 3 8 and the third valve system (TVS) 42 are closed and the second valve system (SVS) 40 is open so as to define an air and gas flow path where approximately 3–100% of the maximum compressed air flow from the air storage/vessel system 36 moves through the connecting structure 43 to the combustor 18 and then gas moves to the turbine 16 of the power shaft assembly 12 to produce maximum power (full turbine power) to an electric grid to provide emergency power for uninterrupted power supply. The duration of this mode of operation is also limited to the capacity of the air storage/vessel.

In the case of longer-term power outages, there is a need for substations to deliver emergency power to hospitals, police, etc. Thus, with reference to FIG. 5, a combustion turbine emergency power mode of operation is shown. In this mode, the automatic compressor driving clutch (ACC) 22 and the automatic turbine driving clutch (ATC) 24 are each in the engaged position. The first and third valve systems 38 and 40 are closed and the third valve system (TVS) 42 is open to define a flow path from the compressor 14 through bypass structure 47 and TVS 42 to the combustor 18 and then to the turbine 16 to produce power. Thus, in this mode, the UPSSP 10 operates as a simple cycle combustion turbine power plant and may be employed when the air storage/vessel is depleted. In this mode, power generated is approximately 50% of full turbine power since turbine power is need to drive the compressor.

Figure 6:
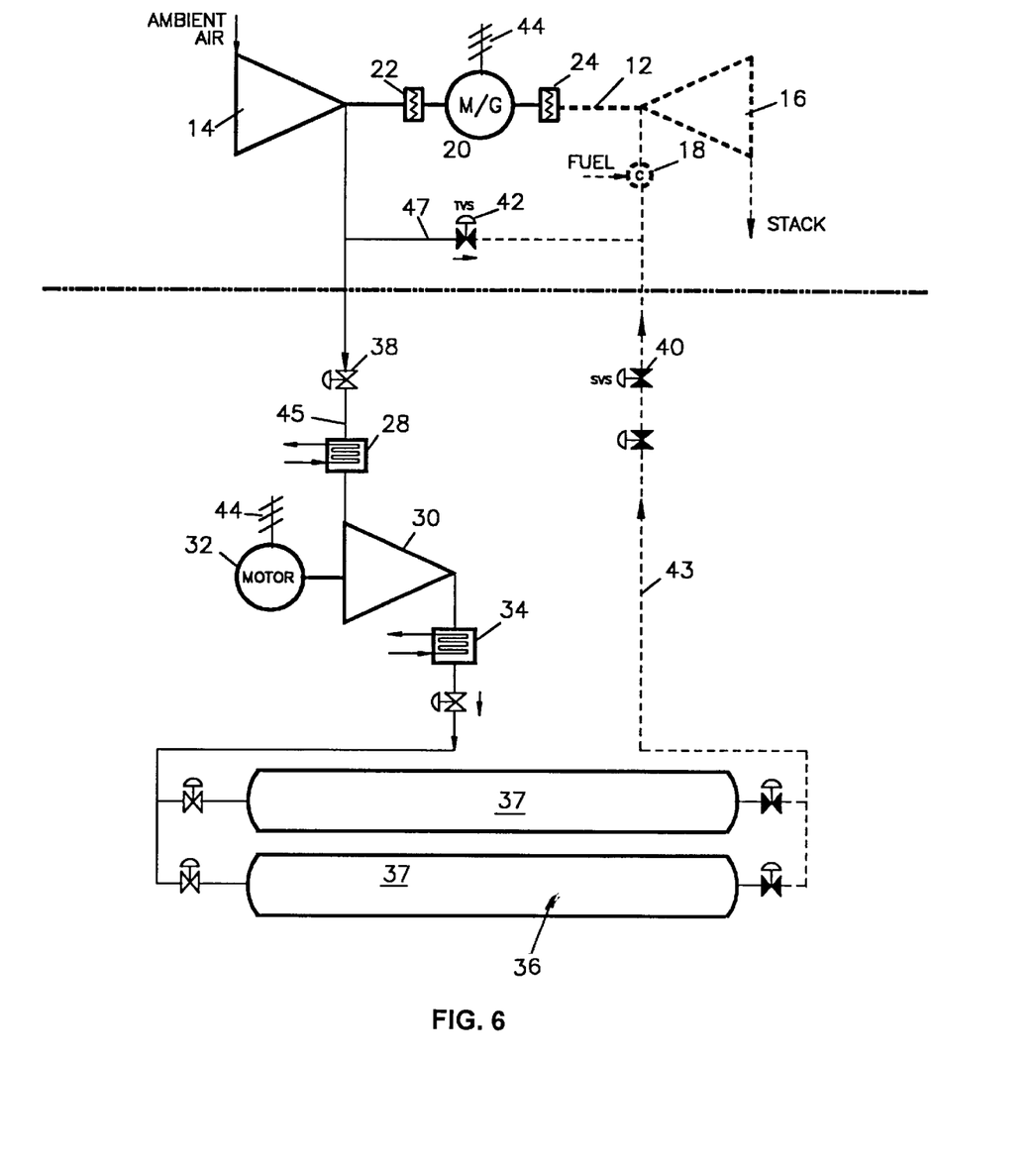
FIG. 6 is a schematic diagram of the system of FIG. 1, showing an air storage charging mode of operation.

The charging mode of operation is shown in FIG. 6 and is provided when the automatic turbine driving clutch (ATC) 24 is disengaged and the automatic compressor driving clutch (ACC) 22 is engaged such that the compressor 14 of the power shaft assembly 12 is driven by the motor/generator 20. The second valve system (SVS) 40 and the third valve system (TVS) 42 are closed and the first valve system (FVS) 38 is open so as to define an air flow path where compressed air from the compressor 14 moves through flow path structure 45 to the intercooler 28 and is then further compressed in the boost compressor 30 and cooled in the aftercooler 34. The compressed air thereafter is charged into the air storage/vessel system 36. In this mode of operation, the motor/generator 20 and the electric motor 32 are coupled to and powered by an electric grid 44.

Since the UPSSP 10 is designed for substation applications it is paramount to have unrestricted siting of the UPSSP 10. Since the UPSSP 10 is primarily associated with relatively small capacity of 300 kW to 30 Mw and short duration of power production, it makes sense to utilize man-made, above ground air storage vessels for storing a limited amount of compressed air. This in turn eliminates any restrictions of siting the UPSSP 10, as compared with siting restrictions of large CAES plants which require large underground geological formations for storing compressed air. The volume of the air storage is inversely proportional to the pressure difference between the maximum pressure in the air storage and the turbine inlet pressure. Thus, the higher this pressure difference, the smaller the volume required of the air storage, which is important for man-made storage vessels with higher costs per unit volume of air storage. Accordingly, the man-made, above ground storage vessels have a high operating pressure difference. For example, in a practical embodiment of the invention having a man-made, above ground air storage vessel, the operating pressure difference is approximately 1500 psi, while the operating pressure difference of a typical large, underground geological formation is approximately 300 psi.

The major original features of the UPSSP 10 of the invention are as follows:

In prior art power plants, power production is typically a prime mode of operation. In contrast to the prior art power plants, a UPSSP's primary operation is a hot stand-by reserve mode, while power production is usually a very infrequent operation during generally only emergency situations. Consequently, while a conventional power plant is optimized for an efficient power production associated with a sophisticated thermal cycle and concept, the thermal cycle and concept of the UPSSP 10 are optimized for a hot stand-by mode to support the fastest possible start-up, the highest possible availability and reliable emergency power delivery with minimum capital costs. Consequently, a UPSSP 10 requires a relatively simple thermal cycle and conceptual configuration.

In contrast to a prior art combustion turbine power plant, a UPSSP 10 consists of a modified combustion turbine being complemented and integrated with an additional compression and storage/vessel system.

In contrast to a prior art power plant optimized for full load power production, a UPSSP 10 is optimized for a "hot" stand-by reserve mode of operation, when an expansion turbine (with disconnected compressor) is continuously operating at minimum possible load to drive a synchronized electric motor/generator with zero electric power generated to the grid and to cover associated losses. This operation keeps the expansion turbine hot and in a ready condition to ensure plant loading to full power in a few seconds—the critical time for quality power supply by a substation.

In contrast to a prior art combustion turbine, a UPSSP 10 can generate an additional power exceeding the maximum base load power rating of the original SCCT by approximately 100% (depending on the combustion turbine derivative power generation system type), when an expansion turbine, with a combustor feeding the turbine, is provided with motive compressed air stored in an additional compressed air storage/vessel system, the turbine drives a motor/generator (via engaged ATC) and a compressor is mechanically disconnected from the motor/generator (via the disengaged ACC).

In contrast to a combustion turbine power plant, a UPSSP 10, due to "hot" stand-by operation, can be started-up from zero load to full load within a few seconds, while a combustion turbine, the fastest starting thermal plant, requires a few minutes to reach full load.

In contrast to a prior art CAES plant, which for competitive economics requires a sophisticated thermal cycle with intercoolers, compressors, reheat turbo expander train and a recuperator, the UPSSP 10 thermal cycle is based on a simple-cycle configuration for fast and reliable emergency power supply, with a UPSSP cycle efficiency being a secondary consideration.

In contrast to a prior art CAES plant, as disclosed, for example, in U.S. Pat. No. 4,765,142, which requires large capacities (measured in hundreds of megawatts) for an effective utility load management, the level of capacities of a UPSSP 10 plant, primarily is much lower and is in a range from 300 kW for small substations to 10–30 MW for large substations. These size differences are associated with different thermal cycle parameters (for example, typically lower turbine inlet temperatures for smaller sizes), concepts (gear-driven generators for smaller sizes) and compressed air storage methods (smaller sizes make it possible to store energy in above-ground vessels).

In contrast to a prior art CAES plant optimized for a load management function with large amounts of energy stored, where the compressed air is stored in very large underground geological formations (salt depositions, hard rock or aquifers), the amount of energy stored for a UPSSP is limited to provide an emergency power for very short periods, when energy delivery by a primary power source is interrupted. Therefore, in accordance with the principles of the present invention, the compressed air could be stored in relatively small man-made above-ground pressure vessels.

In contrast to a prior art CAES plant with siting significantly limited by an availability of acceptable geological formations, a UPSSP, with the compressed air storage in above ground pressure vessels, has unlimited siting possibilities at various substation sites.

In contrast to a prior art CAES plant with a standard sophisticated turbomachinery of a particular power and other characteristics, the novel approach can utilize any combustion turbine of any size and modify it for UPSSP application.

In contrast to a prior art CAES plant, a UPSSP has a motor-driven boost compressor with a single function of increasing the above-ground storage from a minimum storage vessel pressure (a SCCT's compressor discharge pressure) to a maximum vessel pressure. The boost compressor provides significant versatility to the UPSSP concept: different maximum pressure requirements could be accommodated by a change in a boost compressor characteristics without affecting a modified SCCT.

In contrast to a prior art CAES plant which economics are very significantly affected by the efficiency of frequent recharging (daily and weekly) of the underground storage with large amounts of the compressed air, a UPSSP's boost compressor and storage system are optimized for a minimum construction cost of the boost compressor and the above-ground compressed air storage vessel. Since the UPSSP is generally in a stand-by mode, there is very infrequent recharging of the air storage/vessel system.

In contrast to prior art power plants, in order to minimize the relatively expensive above-ground storage/vessel volume and cost, the optimum operating compressed air pressure difference for the above-ground storage is much larger (approximately 1500 p.s.i.), than that typically selected for an underground storage in a geological formation (300–500 p.s.i.).

In accordance with the invention, a new UPSSP 10 provides an uninterrupted quality power supply by a substation to customers. The novel UPSSP concept provides for the UPSSP's continuous operation with zero load to ensure a "hot" start-up to full load in a few seconds with the highest reliability and availability. In prior art power plants the fastest start-up times are estimated in minutes with reliability and availability characteristics being lowered by thermal cycle sophistication, necessitated by requirements for an efficient power supply.

In accordance with yet a further aspect of this invention, an SCCT is modified to provide for a mechanical engagement and disengagement of a compressor to or from, respectively, a motor/generator; to provide for engagement and disengagement of a motor/generator to or from, respectively, a turbine; to ensure that, if necessary, all power generated by a turbine will be converted into electric energy during emergency power supply periods (with a compressor being disengaged and accordingly without power losses for the compressor driving). This allows for a turbine to deliver to the grid a power which is approximately 200% of the SCCT power rating.

In accordance with yet a further aspect if this invention, an ACCASS is added to and integrated with a modified SCCT to provide for and use of compressed air stored in an additional air storage vessel/system for an emergency power generation during an interruption of a power supply to a substation by a primary source. The additional system is optimized for specified short interruptions of the power supply.

Further yet, in accordance with another aspect of this invention, a UPSSP is capable of consuming an off-peak power to feed an electric motor driving, via an engaged ACC, a compressor of an SCCT (with the expansion turbine being disengaged) and to feed an electric motor driving an additional boost compressor of an additional a shaft assembly—all for charging an air storage vessel with compressed air to replenish the air consumed during a continuous UPSSP operation in a hot stand-by mode and/or during emergency power supply periods.

Still further yet, in accordance with another aspect of this invention, a UPSSP is integrated into a thermal cycle with a flexibility to recharge a compressed air storage vessel/system using, optionally, either energy from an electric grid to feed electric motors driving air compressors, or using a power generated by a modified SCCT.

Further, in accordance with another aspect of this invention, a UPSSP is based on utilization of modified simple cycle combustion turbines, industrial as well as air-craft-derivative type.

Still further yet, in accordance with another aspect of this invention, the compressed air can be stored in an underground formation (in mined hard rock caverns, in solution mined salt domes, or aquifers) or in a man-made above ground storage system (storage in pressure vessels, high pressure pipes, etc.).

It has thus been seen that the objects of this invention have been fully and effectively accomplished. It will be realized, however, that the foregoing and preferred embodiments have been shown and described for the purposes of illustrating the structural and functional principles of the present invention, as well as illustrating the method of employing the preferred embodiments and are subject to change without departing from such principles. Therefore, this invention includes all modifications encompassed within the spirit of the following claims.

What is claimed is:

1. A method of providing a power generation system including:

modifying a simple cycle combustion turbine system optimized for a "hot" stand-by reserve mode of operation and having a power shaft assembly including a compressor, an expansion turbine and a generator; and a combustor feeding said turbine, said modification including (1) separating said compressor and said turbine, (2) replacing said generator with a double-ended motor/generator, and (3) placing said motor/generator between said compressor and said turbine, said motor generator having a turbine driving clutch structure on one end thereof and a compressor driving clutch structure on the other end thereof, said compressor driving clutch structure being operatively associated with said compressor so that said compressor is driven by said motor/generator when said compressor driving clutch structure is engaged and said turbine driving clutch structure being operatively associated with said turbine so that said motor/generator may be driven by said turbine when said turbine driven clutch structure is engaged, providing an additional compression and compressed air storage system comprising:
 a boost compressor,
 an intercooler feeding the boost compressor,
 an electric motor for driving the boost compressor,
 an aftercooler downstream of said boost compressor,
 a compressed air storage downstream of said aftercooler, integrating said modified simple cycle combustion turbine system and said additional system to provide various flow paths through said power generation system with:

flow path structure permitting communication between an outlet of said compressor and an inlet to said intercooler feeding said boost compressor, connection structure permitting communication between an outlet of said air storage and an inlet to the combustor, bypass structure having a first end coupled to said flow path structure and a second end coupled to said connection structure, said bypass structure permitting communication between an output of said compressor and an inlet of said combustor, and valving to selectively control flow through said flow path structure, said connection structure, and said bypass structure, the integration ensuring the selective provision of one of (i) a "hot" stand-by reserve mode of operation capable of delivering emergency electrical power of specified duration, at full power of said turbine, within seconds (ii) a "cold" stand-by reserve mode of operation to provide emergency power of specified duration, at full power of said turbine, within minutes (iii) an emergency power generation mode of operation capable of providing emergency power of specified duration at full power of said turbine, (iv) a combustion turbine emergency power supply mode to provide emergency power of unlimited duration at a fraction of said full power of said turbine, and (v) a charging mode of operation wherein said air storage is charged with compressed air.

2. The method according to claim 1, wherein said valving is provided by a first valve system for controlling air flow in said flow path structure and disposed between said compressor and said intercooler feeding the boost compressor, a second valve system for controlling air flow in said connection structure and disposed between said air storage and said combustor, and a third valve system for controlling air flow in said bypass structure.

3. The method according to claim 2, wherein said "hot" stand-by reserve mode of operation is provided when said turbine driving clutch structure of said power shaft assembly is engaged and said compressor driving clutch structure is disengaged such that said turbine drives said motor/generator with the turbine operating with the motor/generator synchronized with substantially zero power generated to an electric grid, said first and third valve systems are closed and said second valve system is partially open to provide minimal air flow to said combustor to have said turbine driven motor/generator synchronized with an electric grid so as to deliver emergency electric power within seconds upon further opening of said second valve system.

4. The method according to claim 3, wherein during the "hot" stand-by reserve mode of operation, said second valve system is opened enough to provide approximately 2%–3% of maximum compressed air flow to said turbine to maintain operation of said turbine driven motor/generator synchronized with an electric grid.

5. The method according to claim 2, wherein said "cold" stand-by reserve mode of operation is provided when said compressor driving clutch structure is disengaged and said turbine driving clutch structure is engaged such that said turbine is ready to drive the motor/generator, said first, second and third valve systems are closed with said second valve system being ready to be opened to define an air and gas flow path where compressed air stored in said air storage may move to the combustor and gas may move to said turbine for cold start-up thereof for electric power generation within minutes as a function of heating requirements of said turbine.

6. The method according to claim 2, wherein said emergency power generation mode of operation is provided when said compressor driving clutch structure is disengaged and said turbine driving clutch structure is engaged such that said turbine drives the motor generator, said first and third valve systems are closed and said second valve system is open so as to define an air and gas flow path where compressed air from said air storage moves to said combustor and then gas moves to the turbine of the power shaft assembly to produce emergency power.

7. The method according to claim 2, wherein said combustion turbine emergency power generation mode of operation is provided when said first and second valve systems are closed and said third valve system is open, said compressor driving clutch structure and said turbine driving clutch structure each being engaged, and compressed air from said compressor moves through said bypass structure and to said combustor and then gas moves to said turbine to produce power of unlimited duration at a fraction of said full power of said turbine.

8. The method according to claim 2, wherein said charging mode is provided when said turbine driving clutch structure is disengaged and said compressor driving clutch structure is engaged such that said compressor is driven by said motor/generator and said boost compressor is driven by said electric motor, said second and third valve systems are closed and said first valve system is open so as to define an air flow path where compressed air from said compressor moves along said flow path structure and through said intercooler and is then further compressed in said boost compressor and cooled in the aftercooler, the compressed air thereafter is charged into the air storage, said motor/generator and said electric motor being coupled to and powered by an electric grid.

9. The method according to claim 1, wherein said air storage is a man-made structure comprising one of high pressure piping, at least one pressure vessel, and a concrete reinforced structure.

10. The method according to claim 1, wherein said man-made structure is constructed and arranged to have an operating compressed air pressure difference of approximately 1500 psi or greater to minimized a volume of the man-made structure.

11. A method of operating combustion turbine power generation system including (1) a modified simple cycle combustion turbine system optimized for a "hot" stand-by reserve mode of operation and having a power shaft assembly including a compressor, an expansion turbine, and a double-ended motor/generator between said compressor and said turbine, said motor/generator having a turbine driving clutch structure on one end thereof and a compressor driving clutch structure on the other end thereof, said compressor driving clutch structure being operatively associated with said compressor so that said compressor is driven by said motor/generator when said compressor driving clutch structure is engaged and said turbine driving clutch structure being operatively associated with said turbine so that said motor/generator may be driven by said turbine when said turbine driving clutch structure is engaged, and a combustor feeding said expansion turbine, and (2) an additional system having a boost compressor and an intercooler feeding cooled air to said boost compressor with an outlet of the compressor of the power shaft assembly being connected to an inlet of said intercooler via flow path structure, an electric motor for driving said boost compressor, an aftercooler downstream of said boost compressor, a compressed air storage downstream of said aftercooler, connection structure permitting communication between an outlet of said air storage and an inlet to the combustor, bypass structure having a first end coupled to said flow path structure and a second end coupled to said connection structure, said bypass structure permitting communication between an output of said compressor and an inlet of said combustor, a first valve system for controlling air flow in said flow path structure and disposed between said compressor and said intercooler feeding the boost compressor, a second valve system for controlling air flow in said connection structure and disposed between said air storage and said combustor, and a third valve system for controlling air flow in said bypass structure, said system integrating said modified simple cycle combustion turbine system and said additional system, the method including:

controlling said valve systems to permit alternative flow path arrangements and controlling said clutch structures to provide one of (a) a "hot" stand-by reserve mode of operation wherein said turbine driving clutch structure of said power shaft assembly is engaged and said compressor driving clutch structure is disengaged such that said turbine drives said motor/generator with the turbine operating with the motor/generator synchronized with substantially zero power generated to an electric grid, said first and third valve systems are closed and said second valve system is partially open to provide minimal air flow to said combustor to have said turbine driven motor/generator synchronized with an electric grid so as to deliver emergency electric power at full turbine power within seconds upon further opening of said second valve system, (b) a "cold" stand-by reserve mode of operation wherein said compressor driving clutch structure is disengaged and said turbine driving clutch structure is engaged such that said turbine is ready to drive the motor/generator, said first, second and third valve systems are closed with said second valve system ready to be opened to define an air and gas flow path where compressed air stored in said air storage may move to the combustor and gas may move to said turbine for cold start-up thereof to provide electric power at full turbine power of specified duration within minutes, as a function of heating requirements of said turbine, (c) an emergency power generation mode of operation wherein said compressor driving clutch structure is disengaged and said turbine driving clutch structure is engaged such that said turbine drives the motor generator, said first and third valve systems are closed and said second valve system is open so as to define an air and gas flow path where compressed air from said air storage moves to said combustor and then gas moves to the turbine of the power shaft assembly to produce emergency power at full turbine power of specified duration, (d) a combustion turbine emergency power generation mode of operation wherein said first and second valve systems are closed and said third valve system is open, said compressor driving clutch structure and said turbine driving clutch structure each being engaged, and compressed air from said compressor moves through said bypass structure and to said combustor and then gas moves to said turbine to produce power of unlimited duration at a fraction of said full power of said turbine, and (e) a charging mode of operation wherein said turbine driving clutch structure is disengaged and said compressor driving clutch structure of said at least one power shaft assembly is engaged such that said compressor is driven by said motor/generator, said second and third valve systems are closed and said first valve system is open so as to define an air flow path where compressed air from said compressor moves along said flow path structure and through said intercooler and is then further compressed in said boost compressor and cooled in the aftercooler, the compressed air thereafter is charged into the air storage, said motor/generator and said electric motor being coupled to and powered by an electric grid.

12. The method according to claim 11, wherein said air storage is a man-made structure comprising one of high pressure piping, at least one pressure vessel, and a concrete reinforced structure.

13. The method according to claim 12, wherein said man-made structure is constructed and arranged to have an operating compressed air pressure difference of approximately 1500 psi or greater to minimized a volume of the man-made structure.

14. The method according to claim 11, wherein during the "hot" stand-by reserve mode of operation, said second valve system is opened enough to provide approximately 2%–3% of maximum compressed air flow to said turbine to maintain operation of said turbine driven motor/generator synchronized with an electric grid.

15. A combustion turbine power generation system to provide emergency power at an electric substation comprising:

a modified simple cycle combustion turbine power generation system optimized for a "hot" stand-by reserve mode of operation and having a power shaft assembly including a compressor, an expansion turbine, and a double-ended motor/generator between said compressor and said turbine, said motor/generator having a turbine driving clutch structure on one end thereof and a compressor driving clutch structure on the other end thereof, said compressor driving clutch structure being operatively associated with said compressor so that said compressor is driven by said motor/generator when said compressor driving clutch structure is engaged and said turbine driving clutch structure being operatively associated with said turbine so that said motor/generator may be driven by said turbine when said turbine driven clutch structure is engaged, and a combustor feeding said expansion turbine, and an additional system having a boost compressor, an intercooler feeding cooled air to said boost compressor an electric motor for driving said boost compressor, and aftercooler downstream of said boost compressor, a compressed air energy storage downstream of said aftercooler, said additional system being integrated with said modified simple cycle combustion turbine power generation system by flow path structure permitting communication between an outlet of said compressor and an inlet to said intercooler feeding said boost compressor and connection structure permitting communication between an outlet of said air storage and an inlet to the combustor, said system further including:
bypass structure having a first end coupled to said flow path structure and a second end coupled to said connection structure, said bypass structure permitting communication between an output of said compressor and an inlet of said combustor a first valve system for controlling air flow in said flow path structure and disposed between said compressor and an inlet to said intercooler feeding said boost compressor, a second valve system for controlling air flow in said connection structure and disposed between said air storage and said combustor, and a third valve system for controlling air flow in said bypass structure, said valve systems being controllable to provide various flow paths through said system and said turbine driving clutch structure and said compressor driving clutch being controllable so as to selectively provide (i) a "hot" stand-by reserve mode of operation capable of delivering emergency electrical power of specified duration, at full power of said turbine, within seconds (ii) a "cold" stand-by reserve mode of operation to provide emergency power of specified duration, at full power of said turbine, within minutes (iii) an emergency power generation mode of operation capable of providing emergency power of specified duration at full power of said turbine, (iv) a combustion turbine emergency power supply mode to provide emergency power of unlimited duration at a fraction of said full power of said turbine, and (v) a charging mode of operation wherein said air storage is charged with compressed air.

16. The system according to claim 15, wherein said system is constructed and arranged to provide said "hot" stand-by reserve mode of operation when said turbine driving clutch structure of said power shaft assembly is engaged and said compressor driving clutch structure is disengaged such that said turbine drives said motor/generator with the turbine operating with the motor/generator synchronized with substantially zero power generated to an electric grid, said first and third valve systems are closed and said second valve system is partially open to provide minimal air flow to said combustor to have said turbine driven motor/generator synchronized with an electric grid so as to deliver emergency electric power within seconds upon further opening of said second valve system.

17. The system according to claim 15, wherein said system is constructed and arranged to provide said "cold" stand-by reserve mode of operation when said compressor driving clutch structure is disengaged and said turbine driving clutch structure is engaged such that said turbine is ready to drive the motor/generator, said first, second and third valve systems are closed with said second valve system being ready to be opened to define an air and gas flow path where compressed air stored in said air storage may move to the combustor and gas may move to said turbine for cold start-up thereof for electric power generation within minutes as a function of heating requirements of said turbine.

18. The system according to claim 15, wherein said system is constructed and arranged to provide said emergency power generation mode of operation when said compressor driving clutch structure is disengaged and said turbine driving clutch structure is engaged such that said turbine drives the motor generator, said first and third valve systems are closed and said second valve system is open so as to define an air and gas flow path where compressed air from said air storage moves to said combustor and then gas moves to the turbine of the power shaft assembly to produce emergency power.

19. The system according to claim 15, wherein said system is constructed and arranged to provide said combustion turbine emergency power generation mode of operation when said first and second valve systems are closed and said third valve system is open, said compressor driving clutch structure and said turbine driving clutch structure each being engaged, and compressed air from said compressor moves through said bypass structure and to said combustor and then gas moves to said turbine to produce power of unlimited duration at a fraction of said full power of said turbine.

20. The system according to claim 15, wherein said system is constructed and arranged to provide said charging mode said turbine driving clutch structure is disengaged and said compressor driving clutch structure of said at least one power shaft assembly is engaged such that said compressor is driven by said motor/generator, said second and third valve systems are closed and said first valve system is open so as to define an air flow path where compressed air from said compressor moves along said flow path structure and through said intercooler and is then further compressed in said boost compressor and cooled in the aftercooler, the compressed air thereafter is charged into the air storage, said motor/generator and said electric motor being coupled to and powered by an electric grid.

21. The system according to claim 15, wherein said air storage is one of high pressure piping, at least one pressure vessel, and a concrete reinforced structure.

22. The system according to claim 15, wherein said man-made structure is constructed and arranged to have an operating compressed air pressure difference of approximately 1500 psi or greater to minimized a volume of the man-made structure.

23. The system according to claim 15, wherein during the "hot" stand-by reserve mode of operation, said second valve system is constructed and arranged to be opened enough to provide approximately 2%–3% of maximum compressed air flow to said turbine to maintain operation of said turbine driven motor generator synchronized with an electric grid.

* * * * *